United States Patent
Yu et al.

(10) Patent No.: US 10,798,588 B2
(45) Date of Patent: Oct. 6, 2020

(54) MECHANISM FOR BEAM RECIPROCITY DETERMINATION AND UPLINK BEAM MANAGEMENT

(71) Applicant: MEDIATEK INC., Hsinchu (TW)

(72) Inventors: Chia-Hao Yu, Hsinchu (TW); Ming-Po Chang, Hsinchu (TW); Jiann-Ching Guey, Hsinchu (TW)

(73) Assignee: MediaTek INC., Hsin-Chu (TW)

( * ) Notice: Subject to any disclaimer, the term of this patent is extended or adjusted under 35 U.S.C. 154(b) by 0 days.

(21) Appl. No.: 15/888,315

(22) Filed: Feb. 5, 2018

(65) Prior Publication Data

US 2018/0227786 A1    Aug. 9, 2018

Related U.S. Application Data

(60) Provisional application No. 62/455,039, filed on Feb. 6, 2017, provisional application No. 62/501,936, filed on May 5, 2017.

(51) Int. Cl.
*H04W 16/28*    (2009.01)
*H04B 7/06*     (2006.01)
(Continued)

(52) U.S. Cl.
CPC .......... *H04W 16/28* (2013.01); *H04B 7/0617* (2013.01); *H04B 7/0619* (2013.01);
(Continued)

(58) Field of Classification Search
None
See application file for complete search history.

(56) References Cited

U.S. PATENT DOCUMENTS 9,294,177 B2    3/2016 Wang et al.
2006/0057964 A1*  3/2006 Roy ............... H04B 7/0408
                                                         455/67.11
(Continued)

FOREIGN PATENT DOCUMENTS

CN    105103261 A    2/2013
CN    103475401 A    9/2013
(Continued)

OTHER PUBLICATIONS

Samsung. 3GPP TSG RAN WG1 #87 R1-1612496 Reno, USA 14th-18th. UL beam management RS. R1-1612496. Nov. 2016 (Year: 2016).*

(Continued)

*Primary Examiner* — Andre Tacdiran
(74) *Attorney, Agent, or Firm* — Imperium Patent Works; Zheng Jin

(57) ABSTRACT

A method of beam reciprocity state reporting and uplink beam management in wireless communication systems with beamforming is proposed. In one novel aspect, a BS configures one or more resource sets to a UE for uplink beam management. The one or more resource sets are allocated for UE to transmit UL reference signals using a number of UE beams. The number of UE beams to be trained is reported by the UE, e.g., via a "UE beam reciprocity state (update)" message. The BS also indicates whether a fixed UE TX beam or which UE TX beam is used for transmission, or indicates whether different UE TX beams are used for transmission of different resources in a resource set. The BS then feedback measurement results for UE to choose a proper TX beam.

12 Claims, 9 Drawing Sheets

(51) Int. Cl.
*H04W 72/04* (2009.01)
*H04W 24/10* (2009.01)
*H04L 5/00* (2006.01)
*H04W 76/27* (2018.01)
*H04W 88/02* (2009.01)
*H04W 88/08* (2009.01)

(52) U.S. Cl.
CPC ........... *H04W 24/10* (2013.01); *H04W 72/04* (2013.01); *H04L 5/0023* (2013.01); *H04L 5/0048* (2013.01); *H04L 5/0091* (2013.01); *H04W 72/046* (2013.01); *H04W 76/27* (2018.02); *H04W 88/02* (2013.01); *H04W 88/08* (2013.01)

(56) References Cited

U.S. PATENT DOCUMENTS

| | | | |
|---|---|---|---|
| 2013/0155847 A1 | 6/2013 | Li et al. | 370/225 |
| 2013/0215811 A1* | 8/2013 | Takaoka | H04W 52/42 370/311 |
| 2014/0010129 A1* | 1/2014 | Rubin | H04W 16/14 370/280 |
| 2014/0241242 A1* | 8/2014 | Josiam | H04W 88/02 370/328 |
| 2015/0146484 A1 | 5/2015 | Lee et al. | 365/185.03 |
| 2015/0289147 A1* | 10/2015 | Lou | H04B 7/0413 370/329 |
| 2015/0341095 A1 | 11/2015 | Yu et al. | 370/252 |
| 2016/0080060 A1 | 3/2016 | Yu et al. | 455/452.2 |
| 2016/0087704 A1 | 3/2016 | Guey et al. | 370/336 |
| 2016/0095003 A1 | 3/2016 | Yu et al. | 370/311 |
| 2016/0285583 A1 | 9/2016 | Kasher et al. | 455/67.11 |
| 2017/0231011 A1 | 8/2017 | Park et al. | |
| 2018/0049245 A1* | 2/2018 | Islam | H04W 72/042 |
| 2018/0102827 A1* | 4/2018 | Noh | H04B 7/0452 |
| 2018/0103492 A1* | 4/2018 | Akkarakaran | H04W 72/00 |
| 2018/0103504 A1* | 4/2018 | Quan | H04W 76/28 |
| 2018/0124733 A1* | 5/2018 | Vilaipornsawai | H04W 76/27 |
| 2018/0131434 A1* | 5/2018 | Islam | H01Q 1/246 |
| 2018/0191418 A1 | 7/2018 | Xia et al. | |
| 2018/0199212 A1* | 7/2018 | Lin | H04B 7/088 |
| 2018/0227094 A1 | 8/2018 | Liu et al. | |
| 2018/0227786 A1 | 8/2018 | Yu et al. | |
| 2018/0227898 A1 | 8/2018 | Noh et al. | |
| 2018/0242327 A1 | 8/2018 | Frenne et al. | |
| 2019/0098672 A1 | 3/2019 | Murray et al. | |
| 2019/0174485 A1* | 6/2019 | Osawa | H04L 5/0048 |
| 2019/0349960 A1 | 11/2019 | Li et al. | |

FOREIGN PATENT DOCUMENTS

| | | |
|---|---|---|
| CN | 104734754 A | 12/2013 |
| CN | 105830496 A | 9/2014 |
| CN | 104600873 A | 1/2015 |
| KR | 20180040368 A * | 4/2018 |
| WO | WO2015176684 A1 | 5/2014 |
| WO | WO2016045623 A2 | 9/2014 |
| WO | WO2016164058 A1 | 4/2015 |

OTHER PUBLICATIONS

Samsung. 3GPP TSG RAN WG1 #87 R1-1612511 Reno, USA, 14th-18th.Discussion on UL beam management. Nov. 2016 (Year: 2016).*
Samsung. 3GPP TSG RAN WG1 Meeting #86bisR1-1610984 Lisbon, Portugal, 10th-14th. WF on UL Beam Management. Oct. 2016 Agenda item: 8.1.4.1 (Year: 2016).*
Intel. 3GPP TSG-RAN WG1 #86bis R1-1609517 Lisbon, Portugal, 10th-14th. UL Beam Management. Oct. 2016 (Year: 2016).*
International Search Report and Written Opinion of International Search Authority for PCT/CN2018/075363 dated Apr. 25, 2018 (9 pages).
International Search Report and Written Opinion of International Search Authority for PCT/CN2018/075380 dated May 3, 2018 (9 pages).
R1-1701094 3GPP TSG WG1 NR Ad-Hoc Meeting, Nokia et al., "Beam Management-Beam Reciprocity Impacts", Spokane, USA, Jan. 16-20, 2017 (4 pages).
R1-1612058 3GPP TSG RAN Wg1 Meeting #87, Qualcomm Incorporated, "Beam Reciprocity Aspects", Reno, Nevada, USA, Nov. 14-18, 2016 (11 pages).
R1-1612733 3GPP TSG-RAN WG1 Meeting #87, NTT DOCOMO, Inc., "Beam management with reciprocity based beam determination considering interference", Reno, USA, Nov. 14-18, 2016 (5 pages).
USPTO, office e action for the related U.S. Appl. No. 15/888,299 dated May 17, 2019 (15 pages).
EPO, search report for the EP patent application 17838820.3 dated Sep. 20, 2019 (8 pages).
USPTO, office e action for the related U.S. Appl. No. 15/888,299 dated Dec. 11, 2019 (14 pages).

* cited by examiner

| UL RS configuration | |
|---|---|
| Set #1 | • Resource location indices<br>• Same UE beam |
| Set #2 | • Resource location indices<br>• Different UE beams |
| UL RS configuration | |
|---|---|
| Set #3 | • Resource location indices |
FIG. 15
DCI #1
- Trigger set #1
- Use beam ref. #1
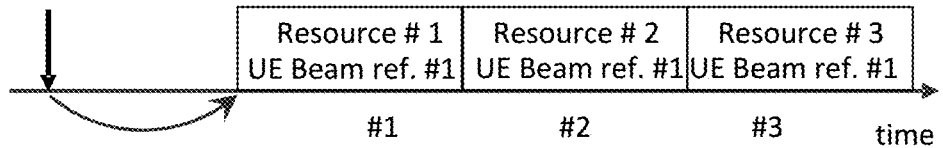
DCI #2
- Trigger set #2
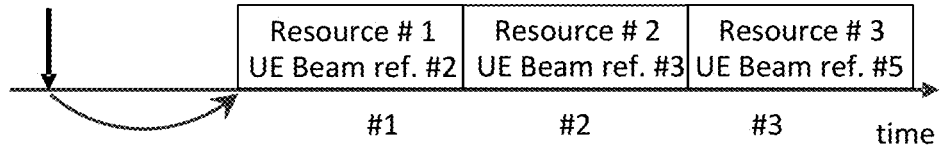
DCI #3
- Trigger set #3
- Use different UE Tx beams
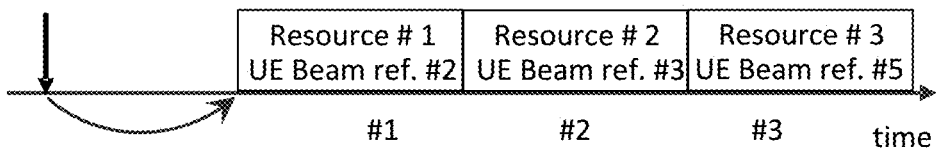
FIG. 16

MECHANISM FOR BEAM RECIPROCITY DETERMINATION AND UPLINK BEAM MANAGEMENT

CROSS REFERENCE TO RELATED APPLICATIONS

This application claims priority under 35 U.S.C. § 119 from U.S. Provisional Application No. 62/455,039, entitled "Mechanism for Beam Reciprocity Determination and UL Beam Management," filed on Feb. 6, 2017; U.S. Provisional Application No. 62/501,936, entitled "Method for Beam Management for Wireless Communication System with Beamforming," filed on May 5, 2017, the subject matter of which is incorporated herein by reference.

TECHNICAL FIELD

The disclosed embodiments relate generally to wireless communication, and, more particularly, to beam reciprocity determination and uplink beam management in a Millimeter Wave (mmW) beamforming system.

BACKGROUND

The bandwidth shortage increasingly experienced by mobile carriers has motivated the exploration of the under-utilized Millimeter Wave (mmWave) frequency spectrum between 3G and 300G Hz for the next generation broadband cellular communication networks. The available spectrum of mmWave band is two hundred times greater than the conventional cellular system. The mmWave wireless network uses directional communications with narrow beams and can support multi-gigabit data rate. The underutilized bandwidth of the mmWave spectrum has wavelengths ranging from 1 mm to 100 mm. The very small wavelengths of the mmWave spectrum enable large number of miniaturized antennas to be placed in a small area. Such miniaturized antenna system can produce high beamforming gains through electrically steerable arrays generating directional transmissions. With recent advances in mmWave semiconductor circuitry, mmWave wireless system has become a promising solution for real implementation. However, the heavy reliance on directional transmissions and the vulnerability of the propagation environment present particular challenges for the mmWave network with beamforming.

For beamformed access, both ends of a link, e.g., both base station (BS) and user equipment (UE), need to know which beamformers to use. In downlink DL-based beam management, the BS side provides opportunities for UE to measure beamformed channel of different combinations of BS beams and UE beams. For example, BS performs periodic beam sweeping with reference signal (RS) carried on individual BS beams. UE can collect beamformed channel state by using different UE beams, and UE then report the collect information to BS. Similarly, in uplink UL-based beam management, the UE side provides opportunities for BS to measure beamformed channel of different combinations of UE beams and BS beams. For example, UE performs periodic beam sweeping with reference signal (RS) carried on individual UE beams. BS can collect beamformed channel state by using different BS beams, and BS then report the collect information to UE.

UE Beam reciprocity state affects whether additional UL-based beam management is required. Beam reciprocity at BS holds if BS is able to determine a BS RX beam for the UL reception based on UE's DL measurement on BS's one or more TX beams, and if BS is able to determine a BS TX beam for the DL transmission based on BS's UL measurement on BS's one or more RX beams. Similarly, reciprocity at UE holds if UE is able to determine a UE RX beam for the DL reception based on BS's UL measurement on UE's one or more TX beams, and if UE is able to determine a UE TX beam for the UL transmission based on UE's DL measurement on UE's one or more RX beams.

UL beam management consumes additional resources heavily and should be minimized. With beam reciprocity or partial beam reciprocity at UE, UL beam management overhead can be reduced. Therefore, it is desirable for UE to report its beam reciprocity to the network for proper UL beam management.

SUMMARY

A method of beam reciprocity state reporting and uplink beam management in wireless communication systems with beamforming is proposed. In one novel aspect, a UE determines its UE beam reciprocity state and sends a "UE beam reciprocity state" message to a BS, which triggers proper uplink beam management accordingly. The UE beam reciprocity state message can take place when UE tries to register to the network. For example, according to factory setting, UE reports at least "Positive" or "Negative" in this message. Beam reciprocity state can be updated by a "UE beam reciprocity state update" message. An auxiliary information can be transmitted to the BS for UL beam management if UE reports "Negative" for beam reciprocity state. The auxiliary information indicates the uncertainty level of UE beams.

In one embodiment, a user equipment (UE) obtains a beam reciprocity state in a beamforming communication network. The UE provides the beam reciprocity state to a base station. The beam reciprocity state indicates a positive or negative UE beam reciprocity state. The UE performs an uplink beam management procedure when the beam reciprocity state indicates the negative beam reciprocity state. The UE receives resource configuration from the base station and transmits reference signals over the configured resource using corresponding UE beams for uplink beam management.

In another embodiment, a base station (BS) receives a beam reciprocity state from a user equipment (UE) in a beamforming communication network. The beam reciprocity state indicates positive, negative, or unsure UE beam reciprocity. The BS triggers an uplink beam management procedure when the beam reciprocity state indicates negative UE beam reciprocity. The beam management procedure involves configuring resource and receiving reference signals over the configured resource with corresponding UE beams.

In one novel aspect, a BS configures one or more resource sets to a UE for uplink beam management. The one or more resource sets are allocated for UE to transmit UL reference signal using a number of UE beams. The number of UE beams to be trained is reported by the UE, e.g., via the "UE beam reciprocity state (update)" message. The BS also indicates whether a fixed UE TX beam or which UE TX beam is used for transmission, or indicates whether different UE TX beams are used for transmission of different resources in a resource set. The BS then feedback measurement results for UE to choose a proper TX beam.

In one embodiment, a UE obtains resource configuration from a base station in a beamforming communication network. The resource configuration allocates one or more resource sets in time and frequency domain to train a number of UE beams for uplink beam management. The UE obtains beam configuration indicating one or more UE beams to be used for uplink transmission. The UE transmits reference signals over one or more activated resource sets. The UE maps the activated resource set(s) to the one or more UE beams. The UE receives measurement results of the reference signals and thereby determining a proper UE beam for uplink transmission.

In another embodiment, a BS provides resource configuration to a user equipment (UE) in a beamforming communication network. The resource configuration allocates one or more resource sets in time and frequency domain to train a number of UE beams for uplink beam management. The BS activates one or more resource sets and providing beam configuration with one or more UE beams to be used for uplink transmission. The BS performs measurements on reference signals received from the UE over the activated resource set(s). The BS transmits measurement results to the UE for determining a proper UE beam for uplink transmission.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 15 illustrates embodiments of configuring different sets of resources for UL RS transmission via RRC signaling.

FIG. 16 illustrates embodiments of activating one or subset of the configured resource sets for UL RS transmission via DCI.

DETAILED DESCRIPTION

Reference will now be made in detail to some embodiments of the invention, examples of which are illustrated in the accompanying drawings.

Figure 1:
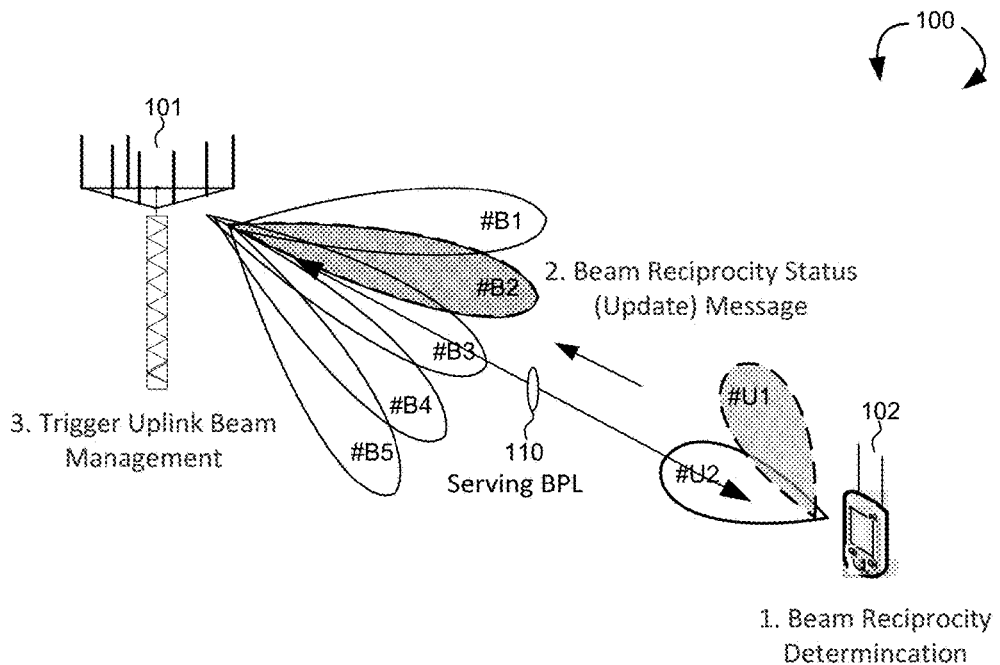
FIG. 1 illustrates a beamforming wireless communication system supporting beam reciprocity reporting and corresponding uplink beam management in accordance with one novel aspect.

FIG. 1 illustrates a beamforming wireless communication system 100 supporting beam reciprocity reporting and corresponding uplink beam management in accordance with one novel aspect. Beamforming mmWave mobile communication network 100 comprises a base station BS 101 and a user equipment UE 102. The mmWave cellular network uses directional communications with narrow beams and can support multi-gigabit data rate. Directional communications are achieved via digital and/or analog beamforming, wherein multiple antenna elements are applied with multiple sets of beamforming weights to form multiple beams. In the example of FIG. 1, BS 101 is directionally configured with multiple TX/RX BS beams, e.g., #B1, #B2, #B3, #B4, and #B5 to cover a service area. Similarly, UE 102 may also apply beamforming to form multiple UE beams, e.g., #U1 and #U2.

The set of BS beams may be periodically configured or occur indefinitely and repeatedly in order known to the UEs. Each BS beam broadcasts minimum amount of cell-specific and beam-specific information similar to System Information Block (SIB) or Master Information Block (MIB) in LTE systems. Each BS beam may also carry UE-specific control or data traffic. Each BS beam transmits a set of known reference signals for the purpose of initial time-frequency synchronization, identification of the beam that transmits the signals, and measurement of radio channel quality for the beam that transmits the signals. In one example, a hierarchical control beam and dedicated data beam architecture provides a robust control-signaling scheme to facilitate the beamforming operation in mmWave cellular network systems.

For beamformed access, both ends of a link need to know which beamformers to use, e.g., a beam pair link (BPL). In downlink DL-based beam management, the BS side provides opportunities for the UE side to measure beamformed channel of different combinations of BS beams and UE beams. For example, BS 101 performs periodic beam sweeping with reference signal (RS) carried on individual BS beams. UE 102 can collect beamformed channel state by using different UE beams, and UE 102 then report the collect information to BS 101. Beam reciprocity state of UE affects whether additional uplink UL-based beam management is required. UL beam management consumes additional resources heavily and should be minimized. With beam reciprocity or partial beam reciprocity at UE, UL beam management overhead can be reduced.

In according with one novel aspect, UE 102 determines its UE beam reciprocity state and sends a "UE beam reciprocity state" message to BS 101, which triggers proper uplink beam management accordingly. The UE beam reciprocity state message can take place when UE 102 tries to register to the network. For example, this message is transmitted in Radio Resource Control (RRC) signaling. According to factory setting, UE 102 reports at least "Positive" or "Negative" in this message. Beam reciprocity state can be updated by a "UE beam reciprocity state update" message. An auxiliary information can be transmitted to the network for UL beam management if UE reports "Negative" for beam reciprocity state. The auxiliary information indicates the uncertainty level of the UE beams.

For UL beam management, BS 101 configures one or more resource sets to UE 102 for uplink beam management. The one or more resource sets are allocated for UE 102 to transmit UL reference signal using a number of UE beams. The number of UE beams to be trained is reported by UE 102, e.g., via the "UE beam reciprocity state (update)" message with auxiliary information. BS 101 also indicates whether a fixed UE TX beam or which UE TX beam is used for transmission, or indicates whether different UE TX beams are used for transmission of different resources in a resource set. BS 101 then feedback measurement results for UE 102 to choose a proper TX beam.

Figure 2:
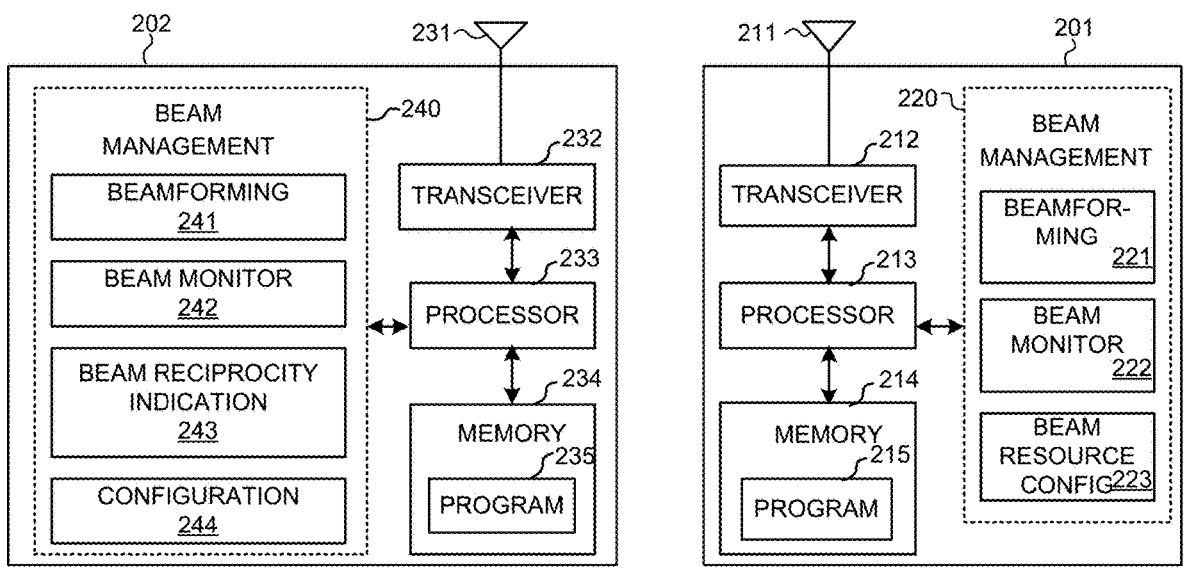
FIG. 2 is a simplified block diagram of a base station and a user equipment that carry out certain embodiments of the present invention.

FIG. 2 is a simplified block diagram of a base station and a user equipment that carry out certain embodiments of the present invention. BS 201 has an antenna array 211 having multiple antenna elements that transmits and receives radio signals, one or more RF transceiver modules 212, coupled with the antenna array, receives RF signals from antenna 211, converts them to baseband signal, and sends them to processor 213. RF transceiver 212 also converts received baseband signals from processor 213, converts them to RF signals, and sends out to antenna 211. Processor 213 processes the received baseband signals and invokes different functional modules to perform features in BS 201. Memory 214 stores program instructions and data 215 to control the operations of BS 201. BS 201 also includes multiple function modules and circuits that carry out different tasks in accordance with embodiments of the current invention.

Similarly, UE 202 has an antenna 231, which transmits and receives radio signals. A RF transceiver module 232, coupled with the antenna, receives RF signals from antenna 231, converts them to baseband signals and sends them to processor 233. RF transceiver 232 also converts received baseband signals from processor 233, converts them to RF signals, and sends out to antenna 231. Processor 233 processes the received baseband signals and invokes different functional modules to perform features in UE 202. Memory 234 stores program instructions and data 235 to control the operations of UE 202. UE 202 also includes multiple function modules and circuits that carry out different tasks in accordance with embodiments of the current invention.

The functional modules and circuits can be implemented and configured by hardware, firmware, software, and any combination thereof. Each module or circuit may comprise a processor with corresponding program codes. For example, BS 201 comprises a beam management module 220, which further comprises a beamforming circuit 221, a beam monitor 222, and a beam resource configuration circuit 223. Beamforming circuit 221 may belong to part of the RF chain, which applies various beamforming weights to multiple antenna elements of antenna 211 and thereby forming various beams. Beam monitor 222 monitors received radio signals and performs measurements of the radio signals over the various beams. Beam resource configuration circuit 223 allocates radio resources and corresponding TX beams to be used for UL beam management.

Similarly, UE 202 comprises a beam management module 240, which further comprises a beamforming circuit 241, a beam monitor 242, a beam reciprocity reporting module 243, and a beam configuration circuit 244. Beamforming circuit 241 may belong to part of the RF chain, which applies various beamforming weights to multiple antenna elements of antenna 231 and thereby forming various beams. Beam monitor 242 monitors received radio signals and performs measurements of the radio signals over the various beams. Beam reciprocity indication circuit 243 determines UE beam reciprocity and sends out UE beam reciprocity state message to BS 201. Beam configuration circuit 244 receives resource and beam configuration from BS 201, such configuration is based on the received UE beam reciprocity state from UE 201 for uplink beam management to achieve reduced overhead.

UE Beam Reciprocity Indication

Figure 3:
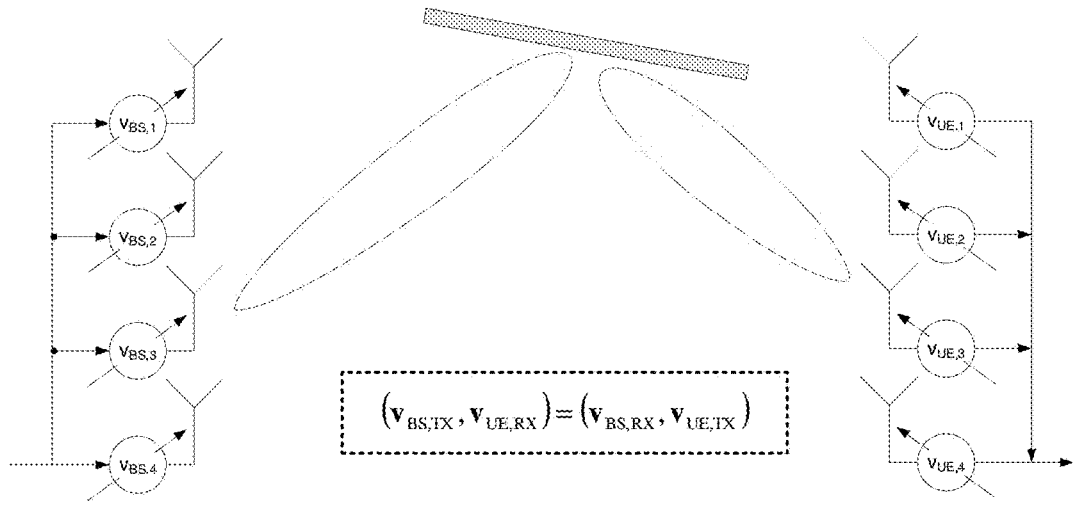
FIG. 3 illustrates definition of beam reciprocity using communication between BS and UE.

FIG. 3 illustrates definition of beam reciprocity using communication between BS and UE. It is sometimes assumed that the downlink channel and the uplink channel is spatially reciprocal in the beamforming system. Under spatially reciprocal beamforming, the same beamformed antenna pattern is used for reception and transmission. TX/RX beam reciprocity at BS holds if BS is able to determine a BS Rx beam for the UL reception based on UE's DL measurement on BS's one or more TX beams, and BS is able to determine a BS TX beam for the DL transmission based on BS's UL measurement on BS's one or more RX beams. Similarly, for UE. As illustrated in FIG. 3, for downlink transmission, the BS applies TX beamforming vector $V_{BS,TX}$ and the UE applies RX beamforming vector $V_{UE,RX}$. For uplink transmission, the BS applies RX beamforming vector $V_{BS,RX}$ and the UE applies TX beamforming vector $V_{UE,TX}$. Under spatially reciprocal beamforming, the beamforming vectors for downlink and uplink are the same, e.g., $(V_{BS,TX}, V_{UE,RX})=(V_{BS,RX}, V_{UE,TX})$.

Figure 4:
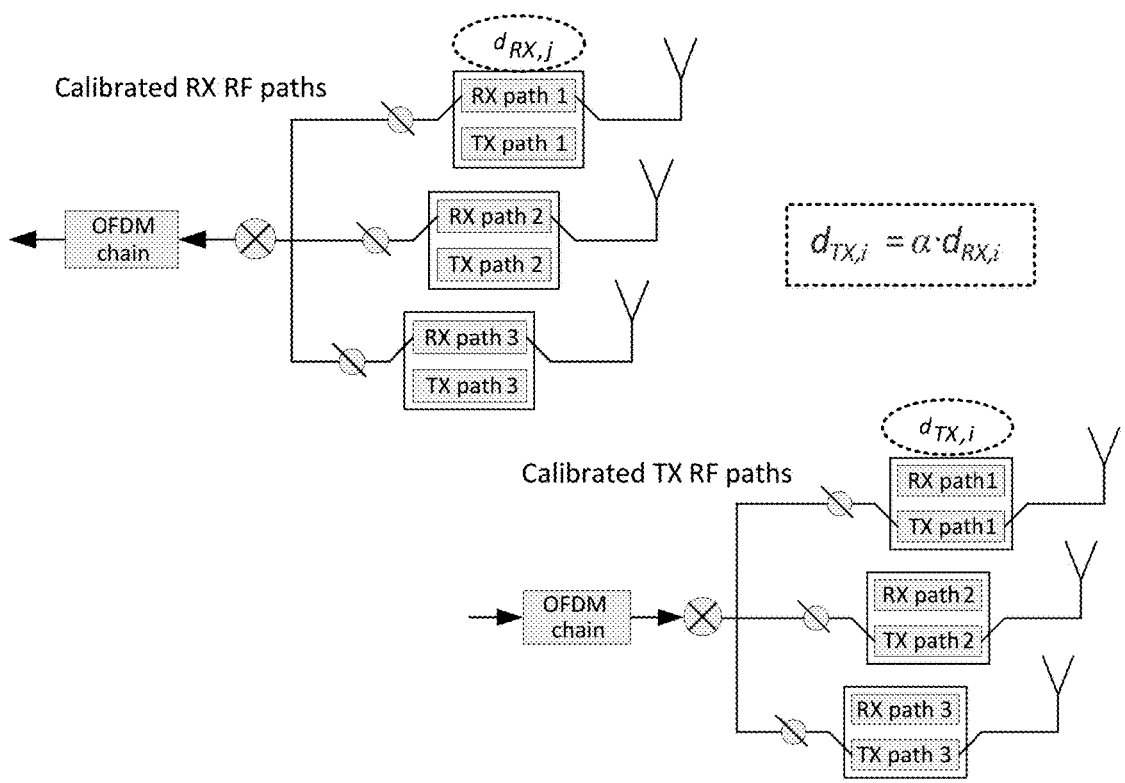
FIG. 4 illustrates calibrated RX and TX RF paths and beam reciprocity.

FIG. 4 illustrates calibrated RX and TX RF paths and beam reciprocity. To form desired beam pattern, a relative complex gain between individual RF paths need to be controlled. Individual RF paths are calibrated in phase/magnitude, thus considered coherent. Absolute complex gain is not important for beam pattern. This applies for either TX paths or for RX paths. To claim beam reciprocity, the calibrated complex gain of TX path i ($d_{TXi}$) and RX path i ($d_{RXi}$) can be subject to a fixed complex gain. As depicted in FIG. 4, beam reciprocity of the illustrated array is maintained under the fixed complex value a, e.g., $d_{TXi}=\alpha d_{RXi}$. Component response of individual RF paths is subject to variation during manufacturing. With factory calibration to assure aligned response, RF component response is also affected by temperature and aging. Partial beam reciprocity is a sensible assumption. RF component variation introduces difference between TX and RX responses. For a coarse beam, beam reciprocity can be treated as hold. For a refined beam, beam reciprocity is not necessarily true. Beam reciprocity state of UE affects whether additional uplink UL-based beam management is required. Furthermore, with partial beam reciprocity at UE, UL beam management overhead can be reduced.

In accordance with one novel aspect, UE supports a "UE beam reciprocity state" message and a "UE beam reciprocity state update" message to the network in facilitating uplink beam management. The UE beam reciprocity state message can take place when UE tries to register to the network, e.g., this message is transmitted in RRC signaling, or during initial access such as in RACH Msg1 or RACH Msg3. According to factory setting, UE reports at least "Positive"

or "Negative" in this message. If UE cannot decide its state, UE reports "Negative". Optionally, if UE cannot decide its state, UE reports "Unsure". The indication can be represented by a bit string. For example, all "0" bit string indicates "Negative" state, and all "1" bit string indicates "Positive" state, and other combinations indicate "Unsure" with extra information (e.g., different uncertainty level in terms of beam reciprocity state). The bit length can be dependent on the number of UE analog beam capability, e.g., the largest value of the bit string stands for the number of UE analog beams per antenna panel. There can be another parameter, e.g., a bit string, in capability signaling to represent UE analog beam capability, e.g., the number of UL RS resources needed to train UE beams.

Beam reciprocity state can be updated by the "UE beam reciprocity state update" message, which can be UE-initiated or network-triggered. The signaling takes place in MAC CE or RRC message, e.g., not part of capability signaling if the state is not static, but part of capability signal if the state is not changed frequently. The signaling can take place during initial access to the network, e.g., in Msg1 or Msg3 in RACH procedure. If beam resolution selected by UE is coarse for the time being, report "Positive" state. If beam resolution selected by UE is fine for the time being, report "Negative" state. If UE cannot decide its beam reciprocity state, report "Unsure" state. The indication of the "UE beam reciprocity state update" can be represented by a bit string, similar to the "UE beam reciprocity state" message. Note that if there's no additional "beam reciprocity state update" message, then beam reciprocity state remains unchanged. Furthermore, beam reciprocity stat is not updated if it is part of capability signaling.

Figure 5:
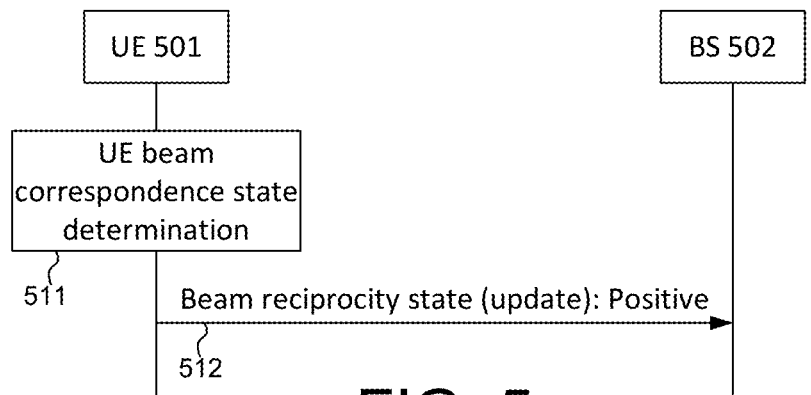
FIG. 5 illustrates a first embodiment of beam reciprocity state indication and update in accordance with a novel aspect.

FIG. 5 illustrates a first embodiment of beam reciprocity state indication and update in accordance with a novel aspect. UE beam reciprocity state is also referred as UE beam correspondence state. In step 511, UE 501 determines UE beam correspondence state. UE 501 can determine its beam reciprocity by different mechanisms. In a first scenario, initial access procedure provides implication of UE beam reciprocity state. For example, if the implication indicates positive state and if following transmissions in CONNECTED mode use same/similar/wider beam resolution as UE beams used during initial access, then the state is positive. On the other hand, if the implication indicates positive state and if following transmissions in CONNECTED mode use narrower (refined) beam resolution as UE beams used during initial access, then the state can be negative. If the implication indicates negative state, then UE reports negative beam reciprocity state. In a second scenario, if UE is capable of beam reciprocity calibration by its own, then periodic triggering of the calibration procedure can ensure positive beam reciprocity state. In a third scenario, If UE is not aware of its current beam reciprocity state, then UE reports either "Negative" state or a "Unsure" state. The "Unsure" state can be represented by, e.g., a series of bits, different bit combinations indicate different uncertainty level in terms of beam reciprocity state. In a fourth scenario, UE can retrieve factory setting for its beam reciprocity state. In step 512, UE 501 transmits the beam reciprocity state message or beam reciprocity state update message to BS 502, which indicates that the UE beam reciprocity state is "Positive".

Figure 6:
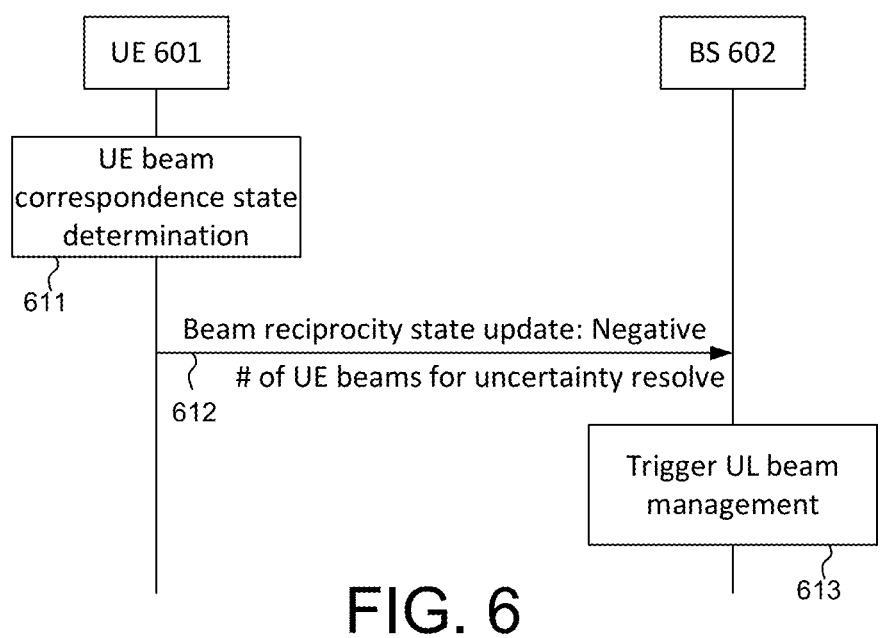
FIG. 6 illustrates a second embodiment of beam reciprocity state indication and update in accordance with a novel aspect.

FIG. 6 illustrates a second embodiment of beam reciprocity state indication and update in accordance with a novel aspect. UE beam reciprocity state is also referred as UE beam correspondence state. In step 611, UE 601 determines UE beam correspondence state, similar to step 511 of FIG. 5. In step 612, UE 601 transmits the beam reciprocity state message or beam reciprocity state update message to BS 602, which indicates that the UE beam reciprocity state is "Negative". Indication of negative beam reciprocity state may result in UL beam management. UE indicates level of "ambiguity" of its partial beam reciprocity. Along with "Negative" state indication, UE also includes e.g., number of UE beams to examine/sweep. The number of UE beams indicated to BS is preferred to be a subset of all UE beams in the considered resolution. Indication of "Negative" state and the level of ambiguity can be aggregated into a bit string. This facilitates the following resource configuration from the BS for UL beam management resources. In step 613, BS 602 triggers UL beam management procedure.

Figure 7:
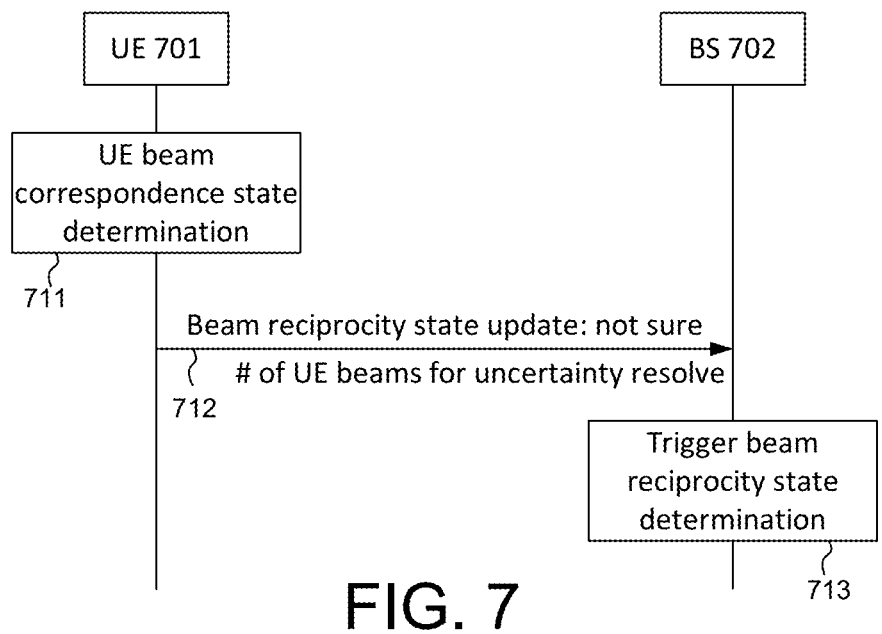
FIG. 7 illustrates a third embodiment of beam reciprocity state indication and update in accordance with a novel aspect

FIG. 7 illustrates a third embodiment of beam reciprocity state indication and update in accordance with a novel aspect. UE beam reciprocity state is also referred as UE beam correspondence state. In step 711, UE 701 determines UE beam correspondence state, similar to step 511 of FIG. 5. In step 712, UE 701 transmits the beam reciprocity state message or beam reciprocity state update message to BS 702, which indicates that the UE beam reciprocity state is "Unsure". Indication of "Unsure" state may trigger BS to initiate a "beam reciprocity state determination procedure" for determining UE beam reciprocity state. UE indicates level of "ambiguity" of its partial beam reciprocity. Along with "Unsure" state indication, UE also includes e.g., number of UE beams to examine/sweep. The number of UE beams indicated to BS is preferred to be a subset of all UE beams in the considered resolution. Indication of "Unsure" state and the level of ambiguity can be aggregated into a bit string. Indication of "Unsure" state may trigger BS 702 to initiate a "beam reciprocity state determination" procedure, as depicted in step 713.

Figure 8:
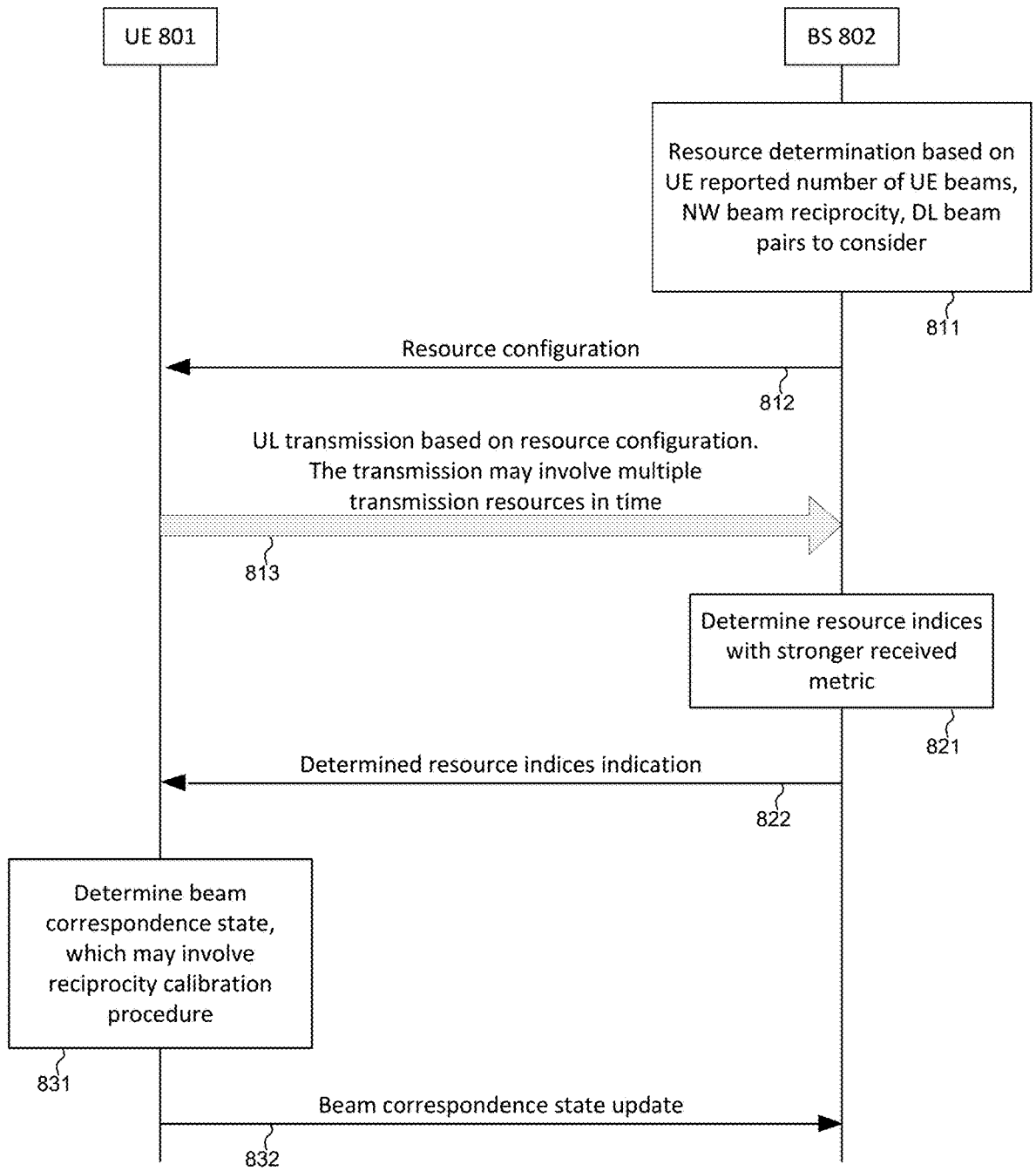
FIG. 8 illustrates a beam reciprocity state determination procedure in accordance with one novel aspect.

FIG. 8 illustrates a beam reciprocity state determination procedure in accordance with one novel aspect. Partial beam reciprocity implies not all beams of interested beam resolution level need to be examined/swept for a considered terminal or network transmission point. The resource configuration for beam reciprocity state determination procedure considers 1) BS beams need to be examined/swept, and 2) The number of UE beams to be examined/swept (the information is reported by UE). For partial beam reciprocity case, BS beams to be examined is simply a subset of all BS beams of the interested beam resolution level. The subset of BS beams to be examined/swept is constrained by DL beam management results. The subset of BS beams is neighboring beams of selected DL BS beam(s) based on DL beam management with the concerned UE. The size of the subset of BS beams depends on BS side beam reciprocity state, e.g., if BS side beam reciprocity holds and only one DL beam pair is considered, the size can be one and the only beam is the same as the selected DL BS beam.

In FIG. 8 step 811, BS 802 determines resource based on UE reported number of UE beams, BS beam reciprocity, and DL beam pairs to consider. In step 812, BS 802 sends resource configuration to UE 801, which indicates UL resources where UL transmission can take place with the selected number of beams. In step 813, UE 801 performs UL transmission. Individual UE beams may be used for multiple times for transmission. The transmission is received by BS 802 with the subset of BS beams. Individual BS beams may be used for multiple times for reception. In step 821, based on the uplink transmission, BS 802 decides a subset of resources with indices that correspond to stronger received metric. The metric can be but are not limited to, e.g., SNR, SINR, RSRP, etc. The size of the subset of resources depends on, e.g., number of considered DL beam pairs. For example, if the number of DL beam pair is one, then the size can be one. In step 822, BS 802 signals the determined resource indices with stronger received metric to UE 801.

In step 831, UE 801 determines its beam reciprocity state, which may involve reciprocity calibration procedure. UE can map the resource indices to corresponding UE beams used for UL transmission. UE can compare the corresponding UE beams with UE beams of considered DL beam pairs. The considered DL beam pairs are determined based on DL beam management procedure. In step 832, UE 801 signals the determined beam reciprocity state to BS 802. If the determined state is "Positive", such signaling can reuse the "UE beam reciprocity state update" message. If the determined state is "Negative", and if beam reciprocity calibration is supported, then calibration procedure can be triggered. The calibration procedure intends to change the state to "Positive" and the updated state is reported. Otherwise, "Negative" state signaling can reuse the "UE beam reciprocity state update" message, which triggers UL beam management procedure.

Figure 9:
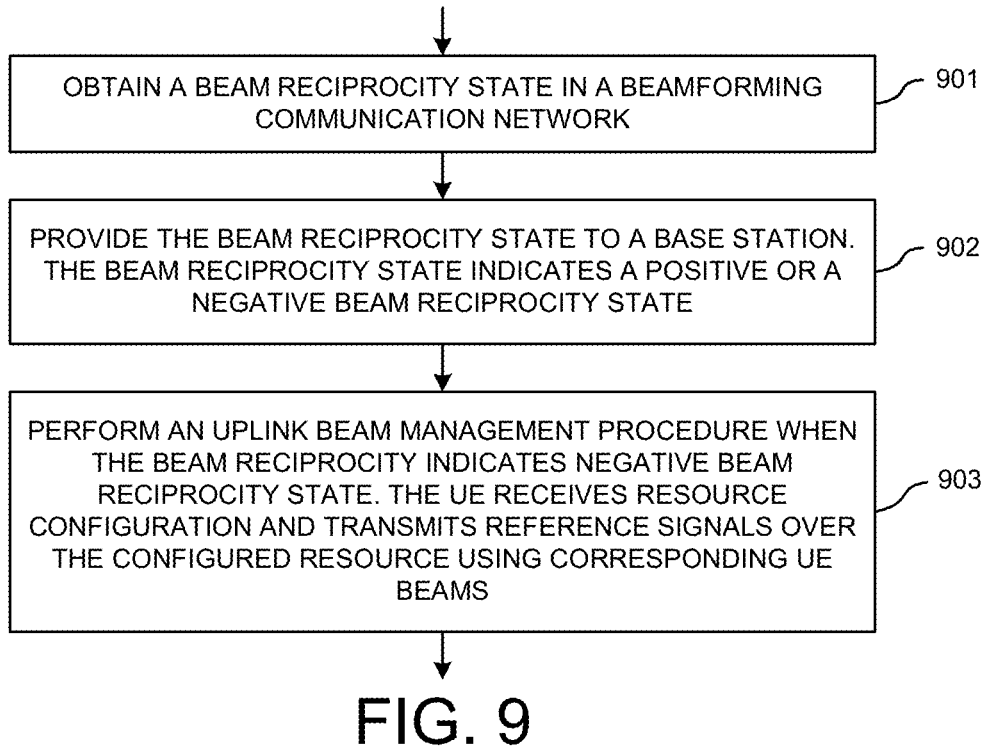
FIG. 9 is a flow chart of a method of beam reciprocity indication from UE perspective in a beamforming system in accordance with one novel aspect.

FIG. 9 is a flow chart of a method of beam reciprocity indication from UE perspective in a beamforming system in accordance with one novel aspect. In step 901, a UE obtains a beam reciprocity state in a beamforming communication network. In step 902, the UE provides the beam reciprocity state to a base station. The beam reciprocity state indicates a positive or a negative beam reciprocity. In step 903, the UE performs an uplink beam management procedure when the beam reciprocity state indicates the negative beam reciprocity state. The UE receives resource configuration from the base station and transmits reference signals over the configured resource using corresponding UE beams.

Figure 10:
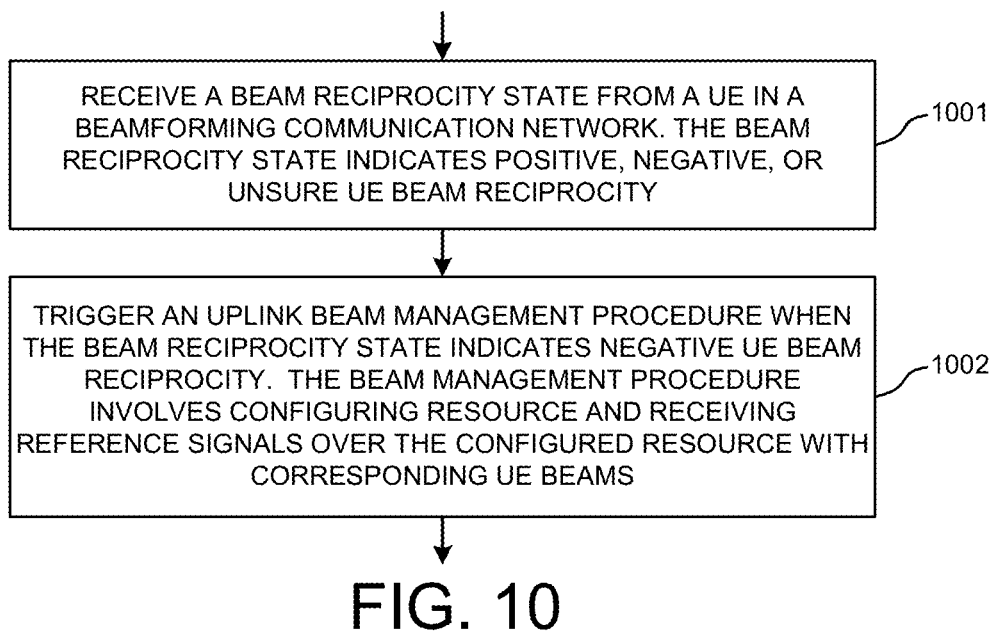
FIG. 10 is a flow chart of a method of beam reciprocity indication from BS perspective in a beamforming system in accordance with one novel aspect.

FIG. 10 is a flow chart of a method of beam reciprocity indication from BS perspective in a beamforming system in accordance with one novel aspect. In step 1001, a BS receives a beam reciprocity state from a user equipment (UE) in a beamforming communication network. The beam reciprocity state indicates a positive or a negative UE beam reciprocity state. In step 1002, the BS triggers an uplink beam management procedure when the beam reciprocity state indicates the negative UE beam reciprocity state. The beam management procedure involves configuring resource and receiving reference signals over the configured resource with corresponding UE beams.

Uplink Beam Management

Figure 11:
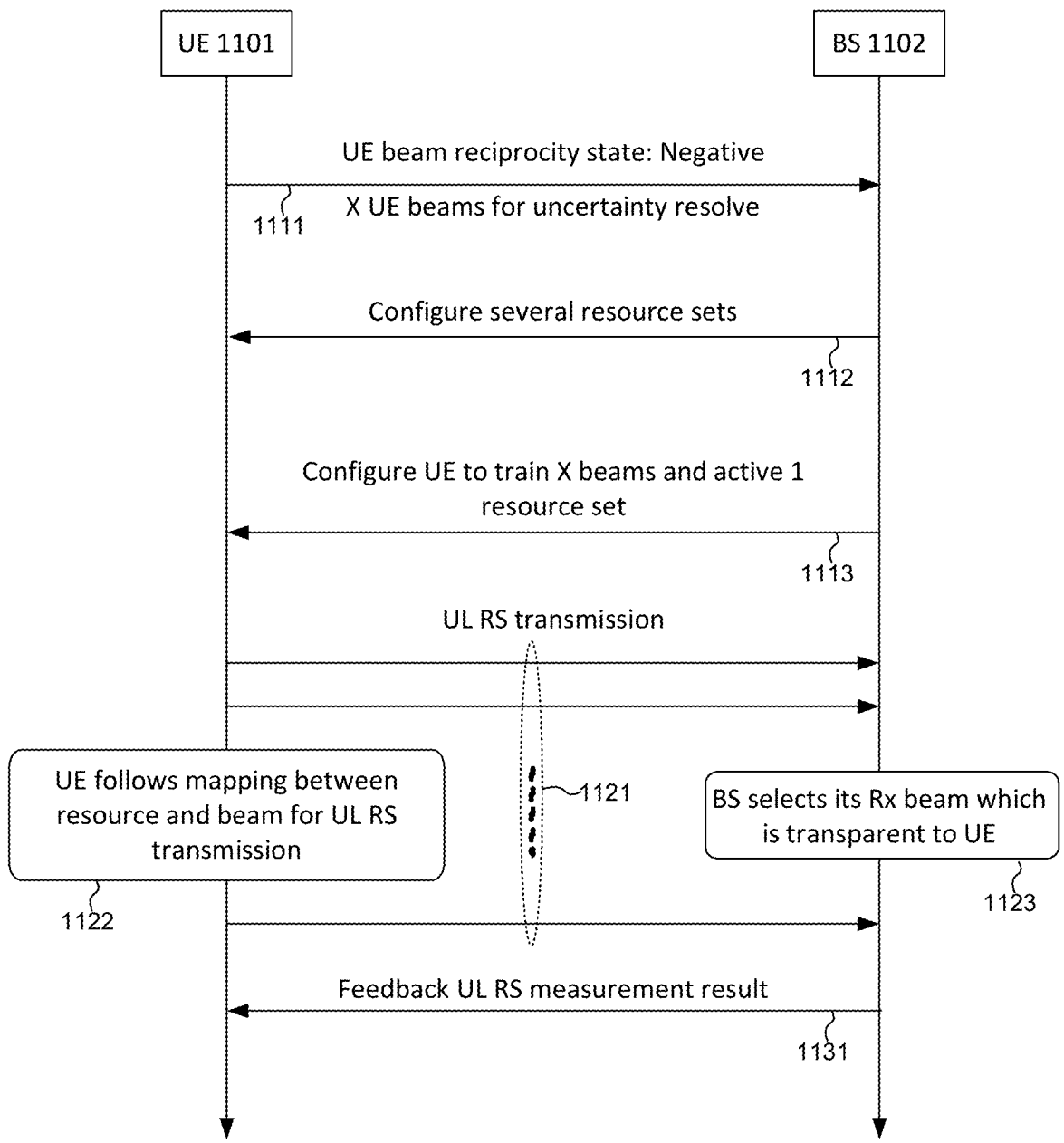
FIG. 11 illustrates an uplink beam management procedure in accordance with one novel aspect.

FIG. 11 illustrates an uplink (UL) beam management procedure in accordance with one novel aspect. With partial UE beam reciprocity, uplink UL-based beam management is needed. Partial beam reciprocity implies not all beams of interested beam resolution level are examined/swept for a considered terminal or network transmission point. In UL beam management, the UE side provides opportunities for BS to measure beamformed channel of different combinations of UE beams and BS beams. For example, UE performs periodic beam sweeping with reference signal (RS) carried on individual UE beams. BS can collect beamformed channel state by using different BS beams, and BS then report the collect information and measurement results to UE such that UE can determine the UL beam pair to be used for UL communication.

In step 1111, UE 1101 transmits a UE beam reciprocity state="Negative" message to BS 1102 together with "auxiliary information". The auxiliary information indicates uncertainty level of UE beams. In one example, it indicates the number of UE beams to be trained in order to select the most proper UL transmit beam. In another example, it indicates the number of UL RS resources that is needed to resolve the uncertainty of UE beams for determining proper UL transmit beam. The auxiliary information can be transmitted together with "UE beam reciprocity state" message or "UE beam reciprocity state update" message. The auxiliary information can be in MAC CE or RRC message. In one example, it can be part of UE capability report. In another example, it can be carried in Msg1 or Msg3 in RACH procedure during initial access to the network. The "negative" state indication and auxiliary information can be represented by a bit string. For example, all "0" bit string indicates "negative" state, and all "1" bit string indicates "positive" state, and other combinations indicate "not sure" with extra information (e.g., different uncertainty level in terms of beam reciprocity state). The bit length can be dependent on the number of UE analog beam capability, e.g., the largest value of the bit string stands for the number of UE analog beam per antenna panel. There can be another parameter e.g., bit string, in capability signal to represent UE analog beam capability, e.g., the number of UL RS resources needed to train UE beams.

In step 1112, BS 1102 configure several resource sets to UE 1101 for UL reference signal (RS) transmission. The resource configuration for UL beam management considers the following factors: 1) BS beams need to be examined or swept and 2) The number of UE beams to be examined or swept that is reported by UE. For the BS beams, for partial beam reciprocity case, BS beams to be examined is simply a subset of all BS beams of the interested beam resolution level. The size of the subset of BS beams depends on BS side beam reciprocity state. For example, if BS side beam reciprocity holds and only one DL beam pair is considered, the size can be one and the only beam is the same as the selected DL BS beam. The subset of BS beams is constrained by serving BS beam(s) determined from DL beam management results. For the number of UE beams, BS can reuse the content included in "Negative beam reciprocity state update" or in "Unsure beam reciprocity state update"; UE can indicate the number of UE beams in a separate report; or BS acquires the number of UE beams from the "auxiliary information" reported by UE when UE reports "Negative" for UE beam reciprocity state. In step 1113, BS 1102 activates one resource set and configures UE 1101 to train the number of UE beams.

In step 1121, UE 1101 transmits UL reference signal to BS 1102 over the allocated resources. The resource configuration can include periodic resources for UE to transmit reference signal with the set of reported ambiguous beams. Additional transmissions can also be configured and triggered aperiodically whenever needed. Individual UE beams may be used for multiple times for transmission in a transmission round. The resource configuration supports a configuration that provides UE to transmit UL reference signal for multiple times by using a same UE beam in a transmission round. The same UE beam can be UE beam used for UL data transmission. The resource configuration supports a configuration that provides UE to transmit UL reference signal for multiple times by using multiple, and optionally different, UE TX beams, respectively in a transmission round. Furthermore, the association of the resources and UE/BS beams can be changed dynamically without additional signaling. BS 1102 adapts its receiving beams for UL beam management receptions based on the selected DL BS beam(s) from DL beam management with UE 1101. Similarly, UE 1101 adapts its transmitting beams for UL beam management transmissions based on the selected DL BS beam(s) from DL beam management with UE 1101. In step 1122, UE 1101 follows mapping between resource and beam for UL RS transmission. In step 1123, BS 1102 selects its RX beam that is transparent to UE. Finally, in step 1131, BS 1102 feedback UL RS measurement result to UE 1101 for determining the proper UE TX beam.

Figure 12:
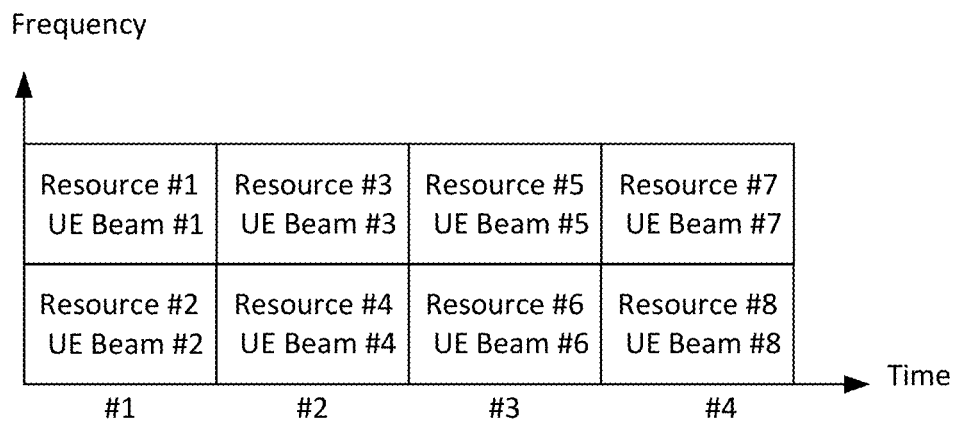
FIG. 12 illustrates a first example of resource configuration for UL beam management.

FIG. 12 illustrates a first example of resource configuration for UL beam management. According to UE capability, network can configure more than one resource per time unit. The use of UE beam on a specific resource can be selected by UE. In the example of FIG. 12, in time unit #1, network configures resources #1 and #2 for UE beams #1 and #2, respectively. In time unit #2, network configures resources #3 and #4 for UE beams #3 and #4, respectively. In time unit #3, network configures resources #5 and #6 for UE beams #5 and #6, respectively. In time unit #4, network configures resources #7 and #8 for UE beams #7 and #8, respectively.

Figure 13:
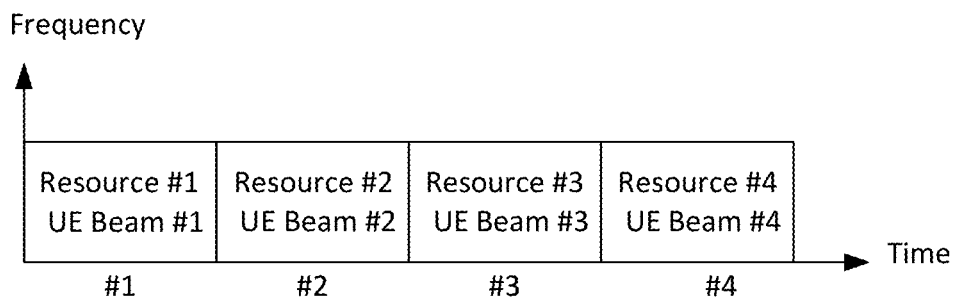
FIG. 13 illustrates a second example of resource configuration for UL beam management.

FIG. 13 illustrates a second example of resource configuration for UL beam management. Network can configure multiple resources in multiple time units with different UE beams. In the example of FIG. 13, network configures resource #1 for UE beam #1 in time unit #1, resource #2 for UE beam #2 in time unit #2, resource #3 for UE beam #3 in time unit #3, and resource #4 for UE beam #4 in time unit #4.

Figure 14:
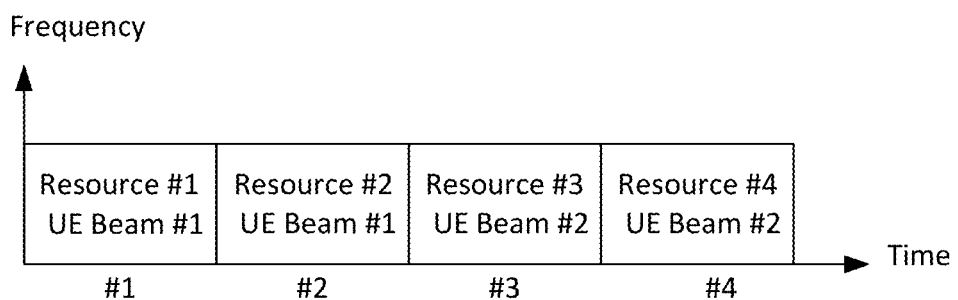
FIG. 14 illustrates a third example of resource configuration for UL beam management.

FIG. 14 illustrates a third example of resource configuration for UL beam management. Network can configure multiple resources in multiple time units with the same UE beam. In the example of FIG. 14, network configures resource #1 for UE beam #1 in time unit #1, resource #2 for UE beam #1 in time unit #2, resource #3 for UE beam #2 in time unit #3, and resource #4 for UE beam #2 in time unit #4.

When the network configures resources for UE to transmit uplink reference signal (UL RS), the network can indicate one or more sets of resources in time and frequency domain (and optionally antenna port). The configuration of the sets of resources can be via RRC signaling. The activation of one or a subset of the resource sets can be via physical layer control channel, e.g., downlink control information (DCI) carried in physical downlink control channel (PDCCH). The number of resources in a resource set is dependent on the number of UE TX beams to be used for UL RS transmission. Further, the network can indicate whether a fixed UE TX beam is used for transmission or not, which of the UE TX beams is used as the fixed UE TX beam, or whether different UE TX beams are used for transmission of different resources in a resource set.

In one embodiment, the network indicates whether a fixed UE TX beam is used for transmission or not. The use of fixed UE TX beam can be indicated together with the resource configuration i.e., via RRC signaling. The use of fixed UE TX beam can be indicated in DCI that is used for triggering UL RS transmission. The indication can be implicit, e.g., when it is not explicitly indicated otherwise, a fixed TX beam is required. Optionally, which of UE TX beams is used as the fixed UE TX beam can be indicated. The indication can be via MAC CE signaling, or in DCI that is used for triggering UL RS transmission. The indication can refer to the UE TX beam that is used for previous UL RS transmission resources. The indication can be via spatial QCL information or can be via beam pair link tag that is associated with UE TX beam for UL traffic. If there is no such indication, it is up to UE decision, when the network demands to use a fixed beam.

In another embodiment, the number of resources in a resource set is dependent on the number of UE TX beams to be used for UL RS transmission. The number of UE TX beams can be decided by the network based on, e.g., the auxiliary information provided by UE. Optionally, the network indicates whether different UE TX beams are used for transmission of different resources, respectively, in a resource set. The use of different UE TX beams can be indicated together with the resource configuration i.e., via RRC signaling. The use of different UE TX beams can be indicated in DCI that is used for triggering UL RS transmission. The indication can be implicit, e.g., when it is not explicitly indicated otherwise, different TX beams are used.

FIG. 15 illustrates embodiments of configuring different sets of resources for UL RS transmission via RRC signaling. As depicted in FIG. 15, the configuration for a first resource set #1 indicates the resource location indices, and the use of a fixed UE TX beam for UL RS transmission. The configuration for a second resource set #2 indicates the resource location indices, and the use of different UE TX beams for UL RS transmission. The configuration for a third resource set #3 indicates the resource location indices.

FIG. 16 illustrates embodiments of activating one or subset of the configured resource sets for UL RS transmission via DCI. As depicted in FIG. 16, DCI #1 triggers UL RS transmission using resource set #1 using the same UE beam, e.g., UL RS transmission using resource #1 with UE reference beam #1 at time unit #1, UL RS transmission using resource #2 with UE reference beam #1 at time unit #2, and UL RS transmission using resource #3 with UE reference beam #1 at time unit #3. DCI #2 triggers UL RS transmission using resource set #2 using different UE beams, e.g., UL RS transmission using resource #1 with UE reference beam #2 at time unit #1, UL RS transmission using resource #2 with UE reference beam #3 at time unit #2, and UL RS transmission using resource #3 with UE reference beam #5 at time unit #3. DCI #3 triggers UL RS transmission using resource set #3 without UE beam indication so UE determines different beams for different resources itself, e.g., UL RS transmission using resource #1 with UE reference beam #2 at time unit #1, UL RS transmission using resource #2 with UE reference beam #3 at time unit #2, and UL RS transmission using resource #3 with UE reference beam #5 at time unit #3.

Figure 17:
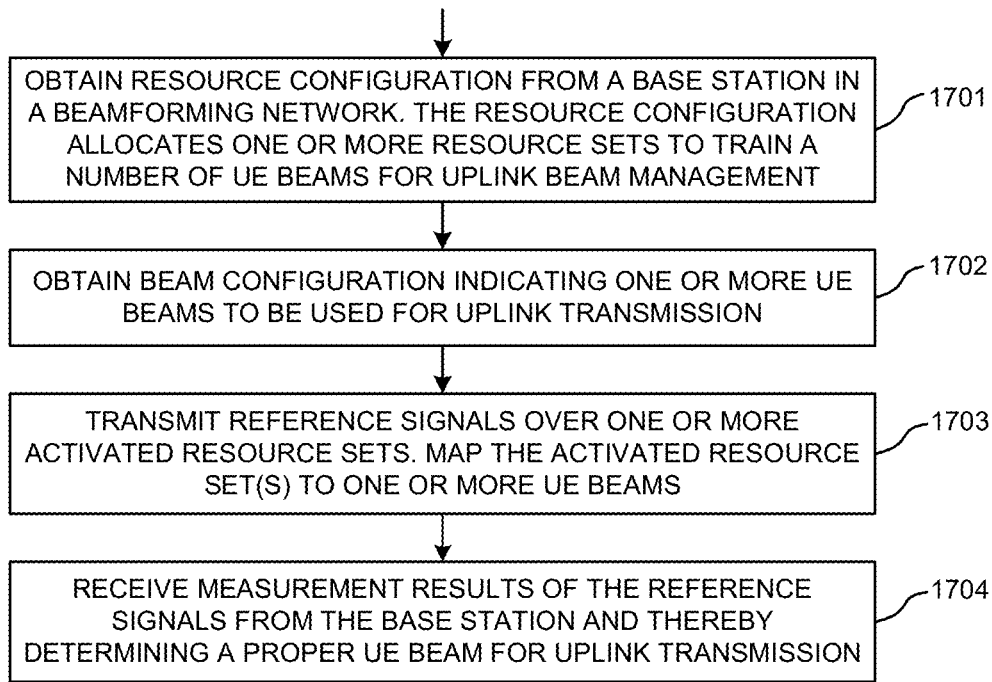
FIG. 17 is a flow chart of a method of uplink beam management from UE perspective in a beamforming system in accordance with one novel aspect.

FIG. 17 is a flow chart of a method of uplink beam management from UE perspective in a beamforming system in accordance with one novel aspect. In step 1701, a UE obtains resource configuration from a base station in a beamforming communication network. The resource configuration allocates one or more resource sets in time and frequency domain to train a number of UE beams for uplink beam management. In step 1702, the UE obtains beam configuration indicating one or more UE beams to be used for uplink transmission. In step 1703, the UE transmits reference signals over one or more activated resource sets. The UE maps the activated resource set(s) to the one or more UE beams. In step 1704, the UE receives measurement results of the reference signals and thereby determining a proper UE beam for uplink transmission.

Figure 18:
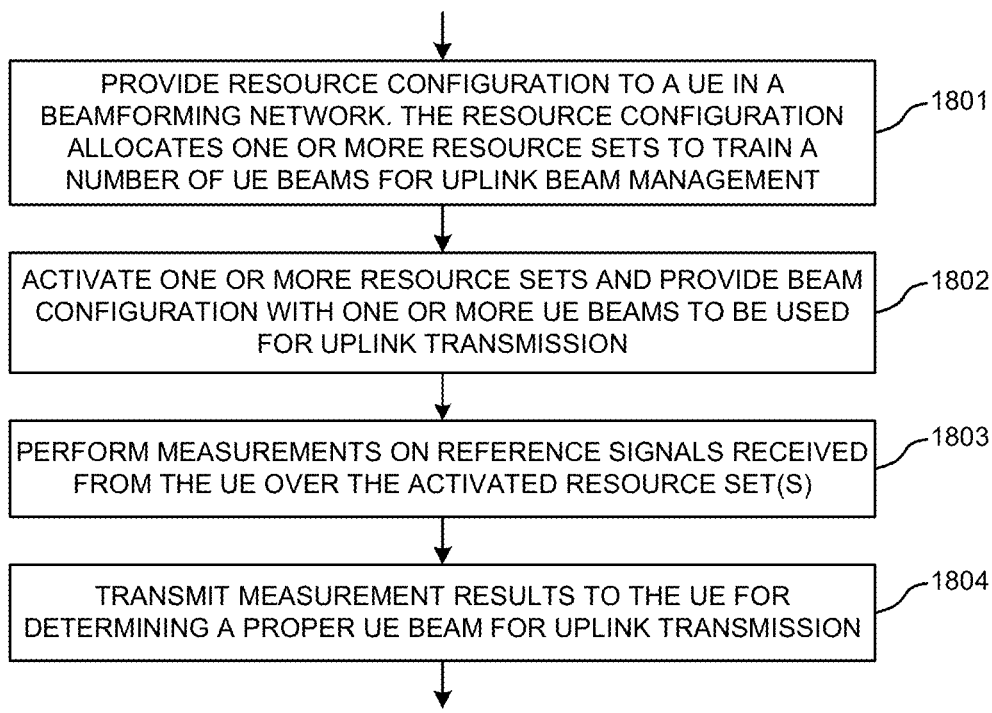
FIG. 18 is a flow chart of a method of uplink beam management from base station perspective in a beamforming system in accordance with one novel aspect.

FIG. 18 is a flow chart of a method of uplink beam management from base station perspective in a beamforming system in accordance with one novel aspect. In step 1801, the BS providing resource configuration to a user equipment (UE) in a beamforming communication network. The resource configuration allocates one or more resource sets in time and frequency domain to train a number of UE beams for uplink beam management. In step 1802, the BS activates one or more resource sets and providing beam configuration with one or more UE beams to be used for uplink transmission. In step 1803, the BS performs measurements on reference signals received from the UE over the activated resource set(s). In step 1804, the BS transmits measurement results to the UE for determining a proper UE beam for uplink transmission.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method performed by a user equipment (UE), the method comprising:
   determining whether a reciprocity state of the UE is positive or negative;
   in response to determining the reciprocity state of the UE is negative:
      triggering a UL beam management operation by transmitting, to a base station, a beam reciprocity state message indicating the reciprocity state of the UE is negative and auxiliary information,
      wherein the auxiliary information contains a field that explicitly indicates a number of UE beams to be trained for uplink beam management;
      obtaining resource configuration from the base station, wherein the resource configuration is in response to the transmitted auxiliary information and allocates one or more resource sets in time and frequency domain to train the number of UE beams for uplink beam management;
      obtaining, from the base station, beam configuration indicating the number of UE beams to be used for uplink transmission;
      transmitting, to the base station, reference signals over one or more activated resource sets from the allocated one or more resource sets,
      wherein the UE maps the one or more activated resource sets to the number of UE beams;
      receiving, from the base station, beamformed channel state information including measurement results of the reference signals from the base station and determining a proper UE beam for uplink transmission using the received beamformed channel state information and measurement results; and
   in response to determining the reciprocity state of the UE is positive, transmitting, to the base station, a beam reciprocity state update message indicating the reciprocity state of the UE is positive.

2. The method of claim 1,
   wherein the UE transmits the reference signals for multiple times by using a same UE beam in a transmission round.

3. The method of claim 1,
   wherein the UE transmits the reference signals for multiple times by using different UE beams in a transmission round.

4. The method of claim 1,
   wherein the UE dynamically associates the one or more resource sets with the number of UE beams.

5. A user equipment (UE), comprising:
   a transceiver;
   at least one processor;
   memory storing instructions, wherein the instructions are executable by the at least one processor to cause the UE to perform the following:
      determining whether a reciprocity state of the UE is positive or negative;
      in response to determining the reciprocity state of the UE is negative:
         triggering a UL beam management operation by transmitting, to a base station, a beam reciprocity state message indicating the reciprocity state of the UE is negative and auxiliary information,
         wherein the auxiliary information contains a field that explicitly indicates a number of UE beams to be trained for uplink beam management;
         obtaining resource configuration from the base station, wherein the resource configuration is in response to the transmitted auxiliary information and allocates one or more resource sets in time and frequency domain to train the number of UE beams for uplink beam management;
         obtaining, from the base station, beam configuration indicating the number of UE beams to be used for uplink transmission;
         transmitting, to the base station, reference signals over one or more activated resource sets from the allocated one or more resource sets,
         wherein the UE maps the one or more activated resource sets to the number of UE beams;
         receiving, from the base station, beamformed channel state information including measurement results of the reference signals from the base station and
         determining a proper UE beam for uplink transmission using the received
         beamformed channel state information and measurement results; and
      in response to determining the reciprocity state of the UE is positive, transmitting, to the base station, a beam reciprocity state update message indicating the reciprocity state of the UE is positive.

6. The UE of claim 5,
   wherein the UE transmits the reference signals for multiple times by using a same UE beam in a transmission round.

7. The UE of claim 5,
   wherein the UE transmits the reference signals for multiple times by using different UE beams in a transmission round.

8. The UE of claim 5,
   wherein the UE dynamically associates the one or more resource sets with the number of UE beams.

9. A method performed by a base station, the method comprising:
   receiving a beam reciprocity state message from a user equipment (UE);
   determining whether the received beam reciprocity state message indicates whether a reciprocity state of the UE is negative or positive;
   in response to determining that the received beam reciprocity state message indicates the reciprocity state of the UE is negative, perform an uplink (UL) beam management operation comprising:
      determining auxiliary information sent from the UE,
      wherein the auxiliary information contains a field that explicitly indicates the number of UE beams to be trained for uplink beam management and the auxiliary information was sent by the UE in response to the UE determining that the reciprocity state of the UE is negative;
      providing, to the UE, resource configuration in response to the auxiliary information, wherein the resource configuration allocates one or more resource sets in time and frequency domain to train the number of UE beams for uplink beam management;

activating one or more resource sets from the allocated one or more resource sets and providing, to the UE, beam configuration for the number of UE beams to be used for uplink transmission;

performing measurements on reference signals received from the UE over the one or more activated resource sets; and transmitting, to the UE, beamformed channel state information including measurement results of the performed measurements on the reference signals received from the UE, wherein the UE determines a proper UE beam for uplink transmission using the beamformed channel state information and the measurement results.

10. The method of claim 9, wherein the base station configures the UE to transmit the reference signals for multiple times by using a same UE beam in a transmission round.

11. The method of claim 9, wherein the base station configures the UE to transmit the reference signals for multiple times by using different UE beams in a transmission round.

12. The method of claim 9, wherein the base station provides the resource configuration via a radio resource control (RRC) layer signaling, and wherein the base station activates the one or more resource sets via a physical layer control channel.

* * * * *